US011188629B2

(12) United States Patent
Van Den Hoven

(10) Patent No.: US 11,188,629 B2
(45) Date of Patent: Nov. 30, 2021

(54) PERSONAL VOICE ASSISTANT AUTHENTICATION

(71) Applicant: KONINKLIJKE PHILIPS N.V., Eindhoven (NL)

(72) Inventor: Gilles Jan Van Den Hoven, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/607,747

(22) PCT Filed: Apr. 20, 2018

(86) PCT No.: PCT/EP2018/060126
§ 371 (c)(1),
(2) Date: Oct. 24, 2019

(87) PCT Pub. No.: WO2018/197343
PCT Pub. Date: Nov. 1, 2018

(65) Prior Publication Data
US 2020/0134147 A1 Apr. 30, 2020

(30) Foreign Application Priority Data
Apr. 24, 2017 (EP) ..................................... 17167775

(51) Int. Cl.
*G06F 21/32* (2013.01)
*G06F 3/16* (2006.01)

(52) U.S. Cl.
CPC ................ *G06F 21/32* (2013.01); *G06F 3/16* (2013.01)

(58) Field of Classification Search
CPC .................................. G06F 21/32; G06F 3/16
See application file for complete search history.

(56) References Cited

U.S. PATENT DOCUMENTS 9,286,899 B1 3/2016 Narayanan
2011/0069661 A1* 3/2011 Waytena, Jr. ......... H04L 63/083
370/328

(Continued)

FOREIGN PATENT DOCUMENTS

WO 2005114904 A1 12/2005

OTHER PUBLICATIONS

P. Milhorat S. Schlogl • G. Chollet • J. Boudy • A. Esposito • G. Pelosi; Building the next generation of personal digital Assistants; 2014 1st International Conference on Advanced Technologies for Signal and Image Processing (ATSIP) (pp. 458-463); (Year: 2014).*

(Continued)

*Primary Examiner* — Luu T Pham
*Assistant Examiner* — Chao Wang

(57) ABSTRACT

Techniques are described herein for authenticating a personal voice assistant using an out-of-band speakable credential. In various embodiments, a user of a mobile application (112) executing on a first client device (104) may be authenticated (302) with a service (110) that executes on server(s) (108) and is configured to interact with personal voice assistant(s). Based on the authenticating, a speakable credential may be provided (304) to the first client device. The providing may trigger the first client device to provide, as output using output device(s) of the first client device, the speakable credential. Data generated in response to an utterance of the speakable credential received at a second client device may be received (306), from a personal voice assistant (106) associated with the second client device (102). The data may be matched (308) to the speakable to authenticate (310) the personal voice assistant with the service.

11 Claims, 5 Drawing Sheets

(56) References Cited

U.S. PATENT DOCUMENTS

| | | | |
|---|---|---|---|
| 2012/0246079 | A1 | 9/2012 | Wilson et al. |
| 2014/0087696 | A1* | 3/2014 | Gressus .............. H04L 63/0853 455/411 |
| 2014/0143666 | A1 | 5/2014 | Domondon |
| 2014/0343943 | A1* | 11/2014 | Al-Telmissani ........ G06F 21/32 704/246 |
| 2015/0087265 | A1 | 3/2015 | Disraeli et al. |
| 2015/0134340 | A1 | 5/2015 | Blaisch |
| 2015/0215299 | A1* | 7/2015 | Burch ..................... H04L 63/18 726/5 |
| 2015/0331666 | A1 | 11/2015 | Bucsa et al. |
| 2016/0262017 | A1 | 9/2016 | Lavee et al. |
| 2018/0137266 | A1* | 5/2018 | Kim ........................ G10L 15/22 |

OTHER PUBLICATIONS

Ho Chiung Ching • C. Eswaran; Simple authentication scheme for Personal Digital Assistants using the Hidden Markov Model toolkit; 2007 International Conference on Intelligent and Advanced Systems (pp. 215-218); (Year: 2007).*

Kosuke Tsujino • Yusuke Nakashima • Shinya Iizuka • Yoshinori Isoda; Speech Recognition and Spoken Language Understanding for Mobile Personal Assistants; 2013 IEEE 14th International Conference on Mobile Data Management (vol. 2, pp. 225-228); (Year: 2013).*

"Conversational Account Linking using Amazon Alexa (without OAuth 2.0)", Video Demo, https://www.bluetube.philips.com/media/Conversational+Account+Linking+using+Amazon+Alexa+%2528without+OAuth+2.0%2529/1_acne2wil, Accessed Oct. 21, 2019.

International Search Report and Written Opinion, International Application No. PCT/EP2018/060126, dated Jul. 5, 2018.

\* cited by examiner

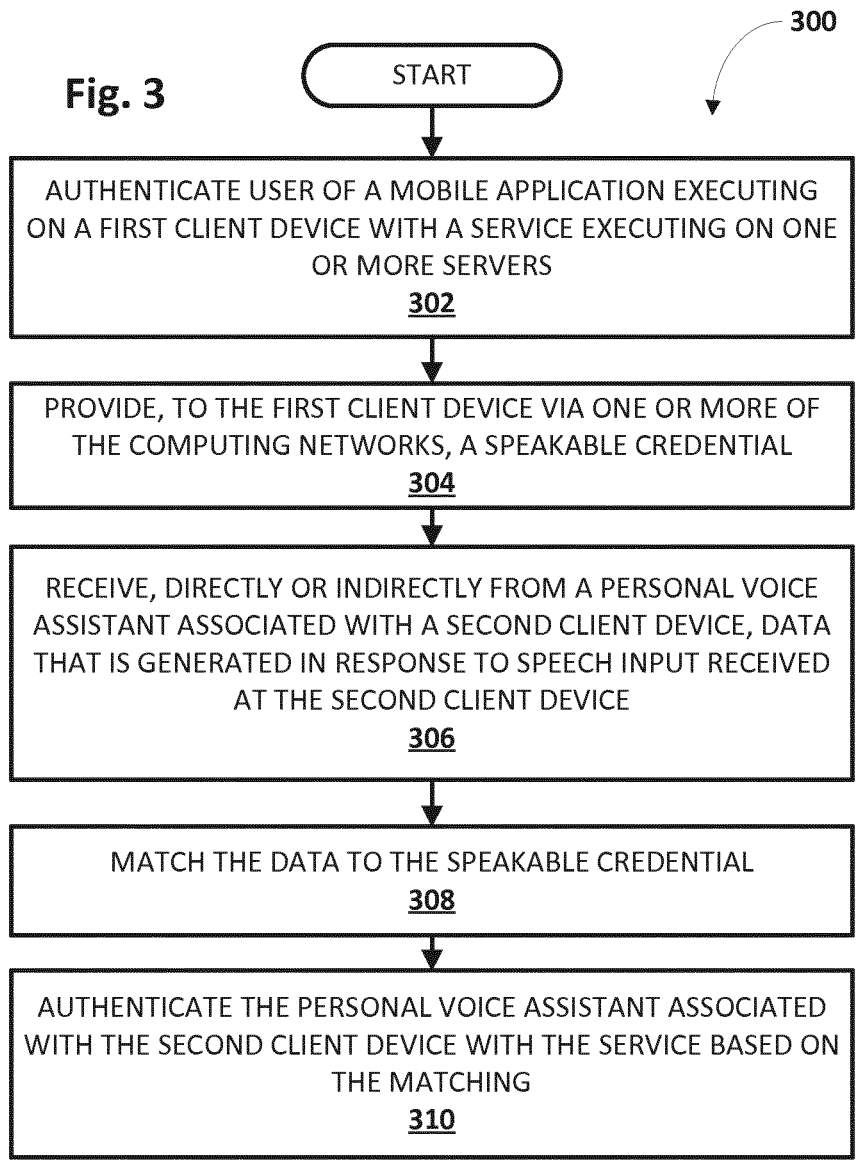

PERSONAL VOICE ASSISTANT AUTHENTICATION

This application is the U.S. National Phase application under 35 U.S.C. § 371 of International Application No. PCT/EP2018/060126, filed on 20 Apr. 2018, which claims the benefit of European Application Serial No. 17167775.0, filed 24 Apr. 2017. These applications are hereby incorporated by reference herein.

TECHNICAL FIELD

Various embodiments described herein are directed generally to personal voice assistant authentication. More particularly, but not exclusively, various methods and apparatus disclosed herein relate to authentication of a personal voice assistant using an out-of-band speakable credential.

BACKGROUND

Humans may engage in human-to-computer dialogs with interactive software applications referred to herein as "personal voice assistants" (also referred to as "automated assistants," "digital agents," "chatbots," "interactive personal assistants," "intelligent personal assistants," "conversational agents," etc.). For example, humans (which when they interact with personal voice assistants may be referred to as "users") may provide commands and/or requests using spoken natural language input (i.e. utterances) which may in some cases be converted into text and then processed, and/or by providing textual (e.g., typed) natural language input. Examples of personal voice assistants include "Alexa" by Amazon.com of Seattle, Wash., "Google Assistant" by Google, Inc. of Mountain View, Calif., "Cortana" by Microsoft of Redmond, Wash., and "Siri" by Apple of Cupertino, Calif.

Some personal voice assistants may be "linked" with a variety of "services" or "skills." These services or skills may enable the voice assistant to perform a wide variety of tasks, such as controlling so-called "smart" (e.g., networked) luminaires, controlling a so-called "smart" thermostat, creating calendar entries, setting reminders, playing media such as music and videos, setting timers, performing web searches, ordering food delivery, obtaining advice regarding childrearing (e.g., based on sensor data from one or more connected devices), post social media status updates, etc. Access to many of these services may require user authentication.

For example, a user may have installed a software application, or "app," on a smart phone that enables the user to order pizza. In order to avoid having to provide billing and other similar information each time the user orders pizza, the user may have a "profile" with the pizza delivery vendor. By logging into their profile, the user can order pizza, and payment information and other details (e.g., their address) may be already saved within the app, so that the user need not provide it again. In some instances, the user may be able to extend or link the pizza delivery app to a personal voice assistant that executes, for example, on one or more computing devices of an "ecosystem" of coordinated devices associated with the user (e.g., a smart phone, smart watch, tablet, interactive standalone speaker, etc.). That way, the user can provide spoken voice commands that will cause the personal voice assistant to order a pizza.

Linking services to personal voice assistants can be challenging, particularly for lay users without technical expertise. Typically, a user cannot engage in a human-to-computer dialog with a personal voice assistant in order to create a link between the personal voice assistant and a service. Additionally, existing linking techniques may require that user-identifiable information pass through a personal voice assistant in order to link the personal voice assistant to a service. Further, existing linking techniques may delay entry of personal voice assistant-based services to market, and may hinder adoption by new users.

SUMMARY

The present disclosure is directed to methods and apparatus for authentication of a personal voice assistant using an out-of-band credential. For example, a user who wishes to link (sometimes referred to as a "symmetrical pairing" or "symmetrical relationship pairing") a particular service with a personal voice assistant that serves the user may first authenticate themselves to the service, e.g., with a username/password, biometric input (e.g., fingerprint scan, retinal scan, etc.), and so forth. This initial authentication may occur using a first client computing device operated by the user, such as a smart phone. Once authenticated, the service and/or an authentication backend may generate what will be referred to herein as a "speakable credential." A speakable credential may take various forms, such as an n-digit code, single or multi-word phrase, or any other string of numbers, characters, symbols, etc., that is capable of being spoken aloud. Additionally, in some embodiments, a so-called "pending symmetrical pairing relation" may be generated, e.g., at the service and/or the authentication backend. The speakable credential may be transmitted to the first computing device being operated by the user and may be presented to the user visually or audibly at the first computing device. This transmission/presentation may be referred to herein as "out-of-band" because it does not involve a personal voice assistant associated with the user. The user may then utter this credential aloud (as an "uttered credential") to a personal voice assistant executing on a second client computing device, such as a standalone interactive speaker or another client computing device that operates one or more aspects of a personal voice assistant. The personal voice assistant may provide the uttered credential to the service and/or authentication backend. If the uttered credential matches the previously generated speakable credential, the personal voice assistant may be thereafter able to interact with the service, e.g., at the request of the user.

Generally, in one aspect, a method may include: authenticating a user of a mobile application executing on a first client device with a service executing on one or more servers, wherein the one or more servers are communicatively coupled with the first client device via one or more computing networks, and wherein the service is configured to interact with one or more personal voice assistants; based on the authenticating, providing, to the first client device via one or more of the computing networks, a speakable credential, wherein the speakable credential is capable of being spoken aloud, and wherein the providing triggers the first client device to provide, as output using one or more output devices of the first client device, the speakable credential; receiving, directly or indirectly from a personal voice assistant associated with a second client device, data that is generated in response to speech input received at the second client device, wherein the speech input included an utterance of the speakable credential; matching the data to the speakable credential; and authenticating the personal voice assistant associated with the second client device with the service based on the matching. Here, the wording "associated with"

may have the meaning of "in communication with" or "being interconnected with". In other words, it is indicated that the personal voice assistant is configured to be connected or in communication with the second client device to allow any types of data exchange or any types of communication format between the personal voice assistant and the second client device, or form a binding relationship, e.g. master and slave relationship, between the personal voice assistant and the second client device.

In various embodiments, the providing may include providing instructions to be output accompanying the speakable credential at the first client device by the personal voice assistant associated with the second client device. In various embodiments, the providing may trigger the first client device to visually output the speakable credential on a display. In various embodiments, the providing may trigger the first client device to audibly output the speakable credential using a speaker. In various embodiments, the providing may trigger the mobile application to provide the speakable credential as output.

In various embodiments, the service may be part of a library of voice-actuable services that are accessible to one or more personal voice assistants. In various embodiments, the speakable credential may be a string of alphanumeric characters. In various embodiments, the speakable credential may include one or more words.

As used herein, a "personal voice assistant" may take the form of software that executes on one or more computing devices. It may receive natural language input from users in the form of spoken utterances, and in various scenarios may participate in a human-to-computer dialog with the user, may initiate one or more tasks (e.g., set a reminder, set a timer, etc.), and/or interact with one or more services (which may be local or cloud-based). A personal voice assistant may include one or more natural language processors (locally and/or on the cloud) that process natural language input to generate, for instance, annotated output that may be "understandable" by other components. In some embodiments natural language input provided by a user may be converted, e.g., by the natural language processor, into textual data. In some embodiments, a personal voice assistant may "serve" a particular user, e.g., by virtue of it executing on one or more client computing devices of a coordinated "ecosystem" of client computing devices operated by the user. In some instances, a personal voice assistant may be trained to recognize a particular user's voice, and may only respond to that user and/or may provide that user with enhanced privileges that the personal voice assistant will not afford to other, unrecognized users. However, this is not required.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating various principles of the embodiments described herein.

FIG. 3 depicts an example method for practicing selected aspects of the present disclosure.

DETAILED DESCRIPTION

Linking services to personal voice assistants can be challenging, particularly for lay users without technical expertise. Typically, a user cannot engage in a human-to-computer dialog with a personal voice assistant in order to create a link between the personal voice assistant and a service. Additionally, existing linking techniques may require that user-identifiable information pass through a personal voice assistant in order to link the personal voice assistant to a service. Further, existing linking techniques may delay entry of personal voice assistant-based services to market, and may hinder adoption by new users. Accordingly, various embodiments and implementations of the present disclosure are directed to authentication of a personal voice assistant using a speakable credential that is delivered to the end user in an out-of-band channel, e.g., via channels other than the personal voice assistant.

Figure 1:
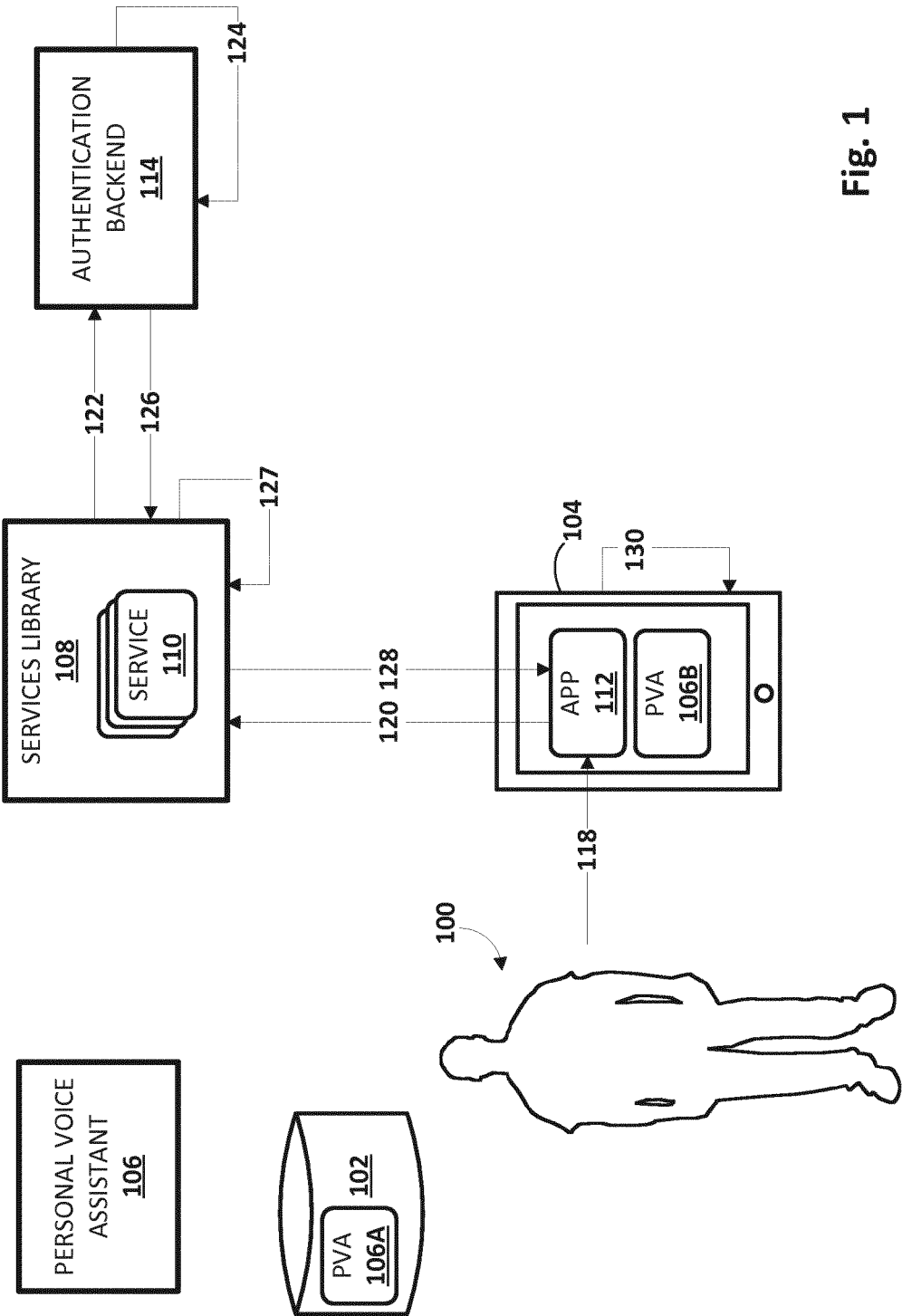
FIG. 1 illustrates an example environment in which disclosed techniques may be practiced, as well as example operations that may be implemented to trigger generation and distribution of a so-called "speakable credential," through an out-of-band channel in accordance with various embodiments.
Figure 4:
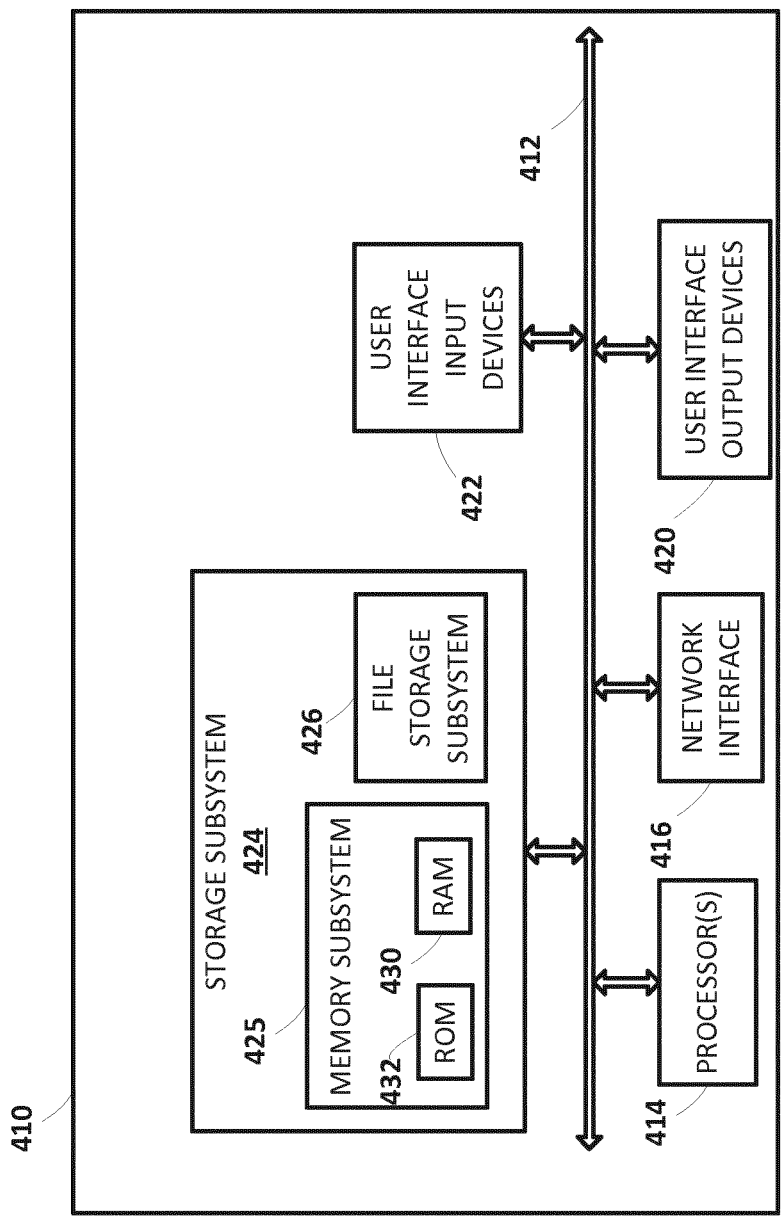
FIG. 4 depicts an example computing system architecture.

FIG. 1 schematically depicts an example environment in which disclosed techniques may be practiced, in accordance with various embodiments. A user 100 may operate multiple client computing devices that in some cases (though not required) may collectively form a coordinated "ecosystem" of client computing devices associated with a profile of the user. For example, in FIG. 1, user 100 operates a first client computing device in the form of a standalone interactive speaker 102 and a second client computing device in the form of a smart phone 104. In various embodiments, client computing devices referred to herein may include various standard computing components, as is depicted in FIG. 4.

One or more client computing devices operated by user 100 may execute all or selected portions of a personal voice assistant 106. For example, in FIG. 1, standalone interactive speaker 102 executes all or portion(s) of a first instance 106A of a personal voice assistant and smart phone 104 executes all or portion(s) of a second instance 106B of a personal voice assistant. Additionally, all or portion(s) of personal voice assistant 106 may be executed separately from devices 102 and 104, such as on one or more computing devices (e.g., servers) forming what is commonly referred to as a "cloud." In some embodiments, local instances of personal digital assistant (e.g., 106A, 106B) may handle human-to-computer dialogs when the client computing device is offline. When the client computing device is online, one or more aspects of personal voice assistant 106 that is remote from the client computing device may handle human-to-computer dialogs. When personal voice assistant 106 is referred to herein, it should be understood that this may refer to a personal voice assistant that operates wholly on a client computing device, partially on a client computing device and partially on the cloud, and/or wholly on the cloud. In some instances, when a user provides spoken input to a local instance of personal voice assistant (e.g., 106A or 106B), that local instance of personal voice assistant may "call" a cloud-based personal voice assistant "service" that, for instance, is indicated at 106 in FIG. 1.

Also depicted in FIG. 1 is a services library 108 that includes one or more services 110 (also referred to as "skills"). In some embodiments, services library 108 may be an online repository of services that are potentially available to one or more apps 112 executing on one or more computing devices. At least some of the services 110 may be voice-actuable services that are accessible by personal voice assistant 106. Services 110 may take various forms, such as ordering food delivery, online shopping apps, weather apps, sports apps, trivia apps, games, etc. In some embodiments, services library 108 may be accessible via a so-called "app store" that enables user 100 to browse, search, and acquire access (e.g., download an app, purchase a license, etc.) to one or more services 110, including at least some voice-actuable services.

Also depicted in FIG. 1 is what will be referred to as an authentication backend 114. Authentication backend 114 may be configured to authenticate users such as user 100 to one or more voice-actuable services 110 available at services library 108, e.g., based on various credentials provided by the users. While components of FIG. 1 are depicted separately, this is not meant to be limiting. In various embodiments, components such as personal voice assistant 106, services library 108, and/or authentication backend 114 may each operate on a distinct computing system, may operate on one or more shared computing systems, may be distributed across any number of computing systems, etc. For example, in some embodiments, services library 108 and authentication backend 114 may be integral and implemented on the same computing system.

FIG. 1 also depicts an out-of-band data exchange that may occur in order to generate a speakable credential that may be used to link personal voice assistant 106 that serves user 100 to one or more voice-actuable services 110. At 118, the user may operate a graphical user interface ("GUI") of an app 112 (e.g., a web browser, app store browser, etc.) operating on client computing device 104 to authenticate user 100 with a targeted service 110 of services library 108. The targeted service may also be voice-actuable, in that it may be possible to access the targeted service 110 by invoking personal voice assistant 106 once a link is established using techniques described herein. To be authenticated with the targeted service 110, user 100 may provide a credential such as username and/or password, one or more security tokens or certificates, biometric data (e.g., retinal scan, fingerprint scan, voice recognition, etc.). User 100 may also provide (at 118) a request to create a relationship (or "link") between personal voice assistant 106 that serves user 100 and the targeted voice-actuable service 110 of services library 108. At 120, this credential may be provided to services library 108. At 122, services library 108 may provide the credential to authentication backend 114, e.g., over one or more computing networks (not depicted).

At 124, authentication backend 114 may authenticate user 100 based on the user's credential. For example, the user may have previously created a profile or "account" with the targeted service 110, which may have included the user establishing credentials such as a username/password, biometric login credentials, etc. These previously-created credentials may be authenticated using conventional authentication techniques. Also at 124, authentication backend 114 may generate a speakable credential, which as mentioned above may be any word, phrase, sequence of one or alphanumeric characters, symbols, etc., that is capable of being spoken aloud. In some embodiments, authentication backend 114 may generate the speakable credential in a form that is not easily perceptible other than visually or audibly. For example, in some embodiments, the speakable credential may be encoded into a bitmap or other type of digital image that visually portrays the speakable credential, as opposed to computer-readable characters (e.g., ASCII text), similar to an image used in a Completely Automated Public Turing Test (CAPTCHA) to screen automated bots from actual human users. In other embodiments, the speakable credential may be encoded into an audio file or data packet(s). In this way, the speakable credential may be somewhat less prone to interception and/or snooping by non-human entities (e.g., software bots).

At 126, authentication backend 114 may provide (e.g., transmit) the speakable credential (e.g., as plain text, encrypted, encoded into a visual or audio file, etc.) to services library 108, e.g., over one or more computing networks (not depicted). At 127, services library 108 may create a pending symmetrical relationship pairing between the targeted services 110 and personal voice assistant 106. At 128, services library 108 may provide (e.g., transmit) the speakable credential to client device 104, e.g., over one or more computing networks (not depicted). At 130, client device 104 may then provide, as output using one or more output devices of the client device 104 such as a display, speaker, etc., the speakable credential. For example, in some embodiments, the app 112 that was used by user 100 to access the targeted service 110 may display instructions to the user for linking personal voice assistant 106 to the targeted service 110. These instructions may include a rendition of the speakable phrase, such as plain text or the encoded image described above. Additionally or alternatively, app 112 may cause client device 104 to audibly output via one or more speakers (not depicted) a rendition of the speakable phrase.

Figure 2A:
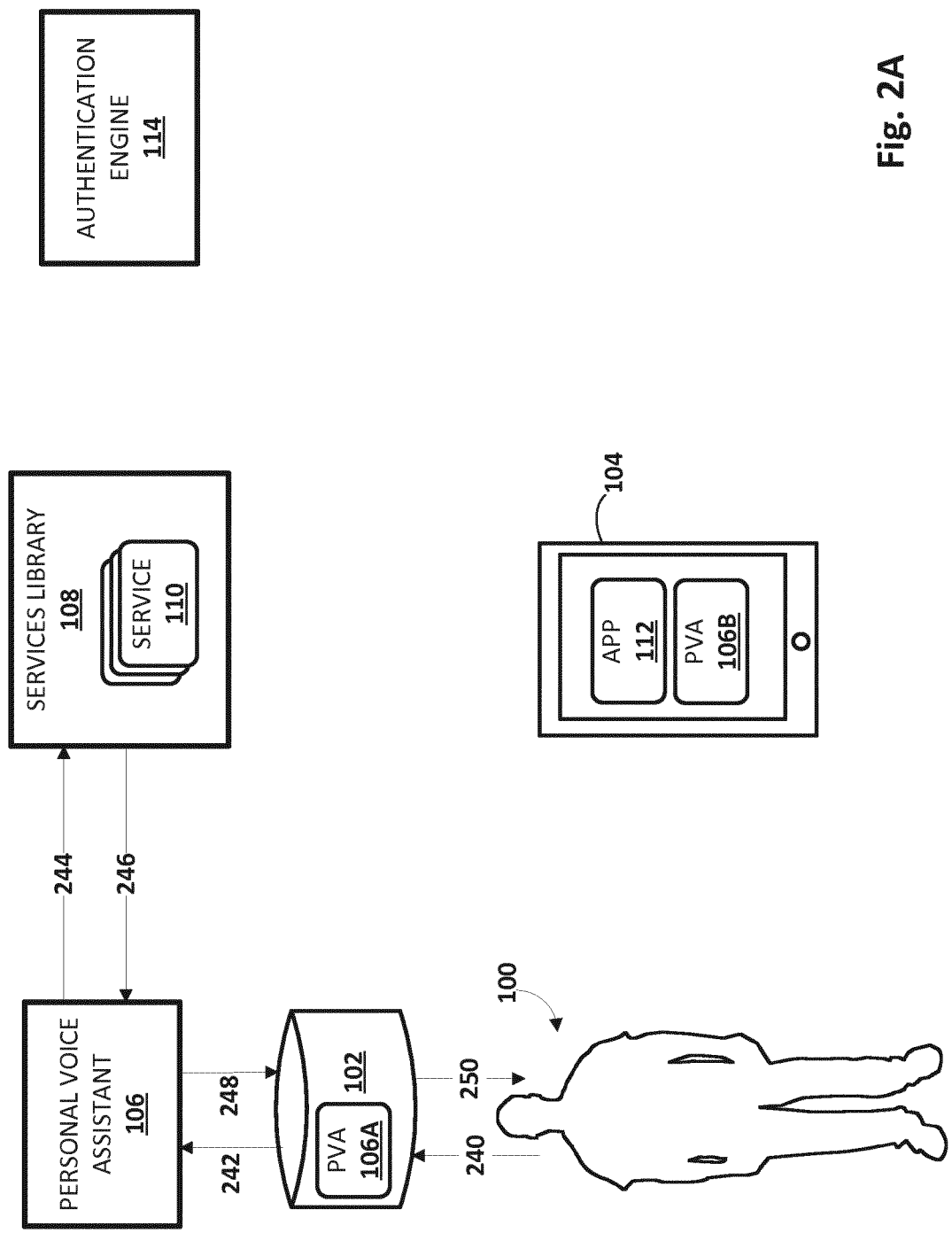
FIGS. 2A and 2B depict one non-limiting example of how a speakable credential may be used to link a personal voice assistant with a targeted service, in accordance with various embodiments.
Figure 2B:
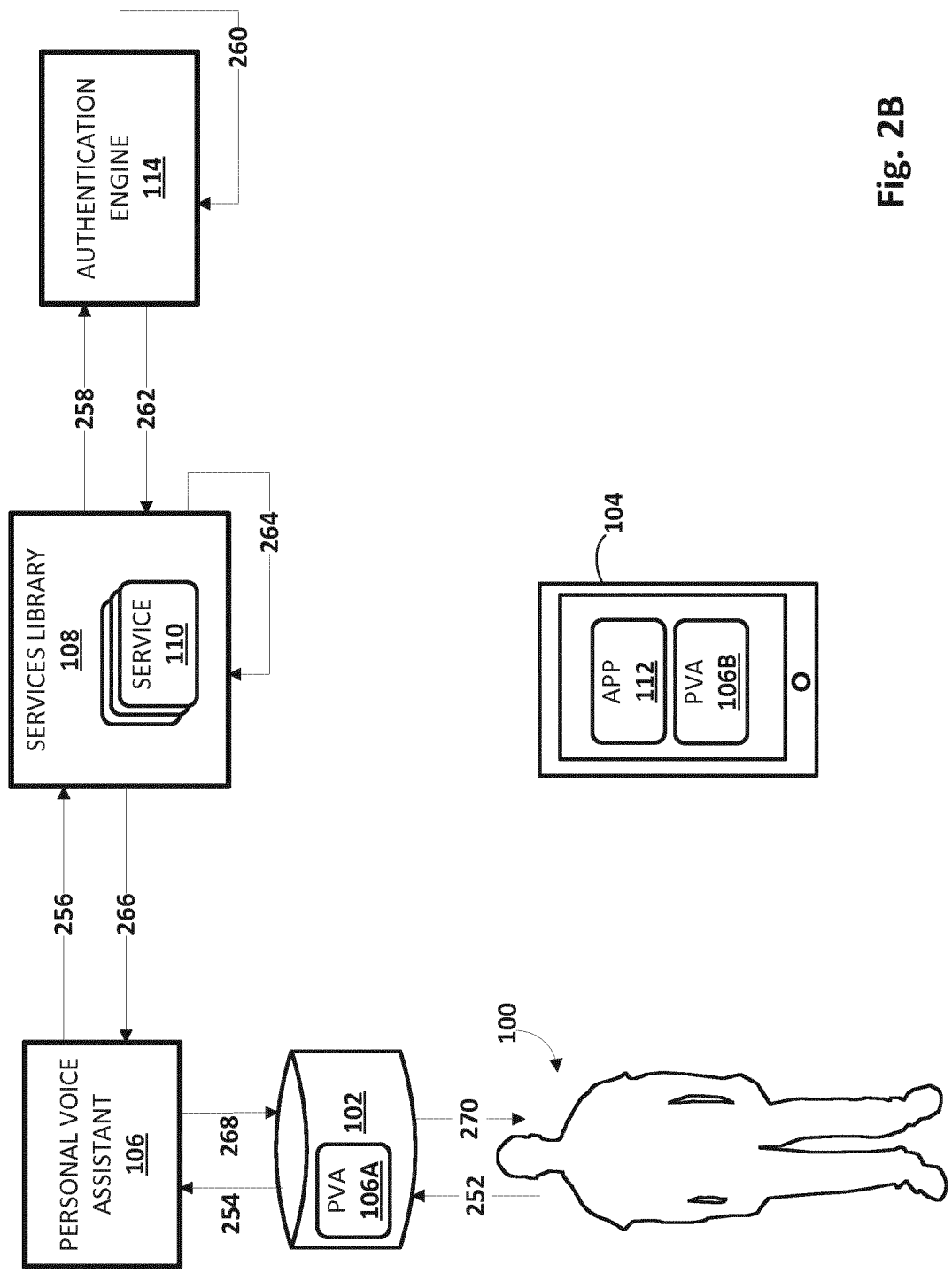

FIGS. 2A and 2B depict one non-limiting example of how user 100 may now use the speakable credential provided as output at 130 in a human-to-computer dialog with personal voice assistant 106 to link personal voice assistant 106 with the targeted service 110. At 240 of FIG. 2A, user 100 may invoke personal voice assistant 106A operating on standalone interactive speaker 102 (or on another device such as smart phone 104) to access the targeted Voice-actuable service 110, e.g., by uttering a trigger phrase such as "Hey personal assistant, perform [task]." As indicated by arrow 242, in some scenarios, this invocation (or processed data indicative thereof, such as textual data) may be passed to cloud-based aspects of personal voice assistant 106, particularly if standalone interactive speaker 102 is currently online.

At 244, personal voice assistant 106 may invoke the targeted voice-actuable service 110 at services library 108. At 246, services library 108 may, based on the pending asymmetric relationship that was created at 127, respond with a question that includes a prompt for the speakable credential. For example, if the speakable credential is an n-digit numeric code, the question returned at 246 may be, for instance, "Please provide your n-digit numeric code." It is not necessary for services library 108 to have knowledge of the speakable credential at this time. Services library 108 only need to be able to ask an appropriate question that solicits the speakable credential. At 248, this question may be relayed by personal voice assistant 106 to the instance of personal voice assistant 106A operating on standalone interactive speaker 102. The instance of personal voice assistant 106A may then cause standalone interactive speaker 102 to audibly output the question at 250.

Referring now to FIG. 2B, at 252, the user utters aloud the speakable credential to standalone interactive speaker 102. At 254, the local instance of personal voice assistant 106A relays the spoken utterance to cloud-based personal voice assistant 106, which then attempts to invoke the targeted service with the spoken credential at 256. At this point, personal voice assistant 106 may have (e.g., by way of a natural language processor) converted the spoken utterance from user 100 into textual content. After services library 108 checks the invocation for correctness, at 258, services library 108 may relay the uttered credential (which as noted above may now by in textual form) to authentication backend 114. At 260, authentication backend 114 matches the uttered credential to the speakable credential previously generated at 124 of FIG. 1. Assuming there's a match, at 262, authentication backend 114 returns some indication of success to services library 108.

At 264, services library 108 may confirm and/or establish an authenticated symmetrical relationship between personal voice assistant 106 that serves user 100 and the targeted voice-actuable service 110. This established relationship may thereafter be referenced whenever user 100 invokes personal voice assistant 106 to access the targeted service 110, without user 100 having to provide credentials. At 266, services library 108 may return some indication of success to personal voice assistant 106, which in turn relays the success indication to the instance of personal voice assistant 106A operating on standalone interactive speaker 102 at 268. At 270, standalone interactive speaker 102 may audibly output some indication of success, such as "A relationship to [targeted service] has been successfully established." From this point onward, if user 100 invokes personal voice assistant 106 to access the targeted skill, services library 108 and/or authentication backend 114 "know" that the targeted skill should be invoked at the request of personal voice assistant 106.

FIG. 3 depicts an example method 300 for practicing selected aspects of the present disclosure, in accordance with various embodiments. For convenience, the operations of the flow chart are described with reference to a system that performs the operations. This system may include various components of various computer systems, including personal voice assistant 106, services library 108, and/or authentication backend 114. Moreover, while operations of method 300 are shown in a particular order, this is not meant to be limiting. One or more operations may be reordered, omitted or added.

At block 302, the system may authenticate a user of a mobile application executing on a first client device with a service executing on one or more servers. In various embodiments, the one or more servers may be communicatively coupled with the first client device via one or more computing networks, and the service may be configured to interact with one or more personal voice assistants (i.e. "voice-actuable"). At block 304, based on the authenticating, the system may provide, to the first client device via one or more of the computing networks, a speakable credential. In various embodiments, the speakable credential may be capable of being spoken aloud. In various embodiments, the providing of block 304 may trigger the first client device to provide, as output using one or more output devices of the first client device, the speakable credential.

At block 306, the system may receive, directly or indirectly from a personal voice assistant associated with a second client device, data that is generated in response to speech input received at the second client device. In various embodiments, the speech input may include an utterance of the speakable credential. In various embodiments, the system may comprise a receiving unit configured to receive data either from other component or transmitter within the system or from another system or apparatus. In various embodiments, the data may be speakable data. At block 308, the system may match the data to the speakable credential. For example, in some embodiments, a natural language processor forming part of a personal voice assistant may convert the spoken input into one or more textual tokens, which may be compared to textual tokens forming the previously-generated speakable credentials.

At block 310, the system may authenticate the personal voice assistant associated with the second client device with the service based on the matching. This authentication may enable the system to establish the symmetrical relationship or pairing described above between the personal voice assistant and the targeted service. Once that relationship/pairing is established, the personal voice assistant may thereafter access the targeted services without having to request speakable credentials from the user.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more aspects of personal voice assistant 106, services library 108, and/or authentication backend 114. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a CD-ROM drive, an optical drive, or removable media cartridges. Modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method, comprising:
   authenticating a user of a mobile application configured to execute on a first client device with a service configured to execute on one or more servers, wherein the one or more servers are communicatively coupled with the first client device via one or more computing networks, and wherein the service is configured to interact with one or more personal voice assistants associated with a second client device, wherein the personal voice assistant receives spoken natural language speech input from a user and converts the spoken natural language input to digital output data;

based on the authenticating, providing, to the first client device via one or more of the computing networks, a speakable credential, wherein the speakable credential is configured to be spoken aloud by the user, and wherein the providing triggers the first client device to provide, as output using one or more output devices of the first client device, the speakable credential;

receiving, directly or indirectly from the personal voice assistant associated with the second client device, digital output data that is generated in response to spoken natural language speech input from the user received at the second client device, wherein the spoken natural language speech input includes an utterance by the user of the speakable credential;

matching the data to the speakable credential;

authenticating the personal voice assistant associated with the second client device with the service based on the matching; and wherein the step of providing the speakable credential includes providing a message to be output accompanying the speakable credential at the first client device by the personal voice assistant associated with the second client device, and further wherein the providing triggers the first client device to visually output the speakable credential on a display.

2. The method of claim 1, wherein the providing triggers the first client device to audibly output the speakable credential using a speaker.

3. The method of claim 1, wherein the providing triggers the mobile application to provide the speakable credential as output.

4. The method of claim 1, wherein the service is part of a library of voice-actuable services that are accessible to one or more personal voice assistants.

5. The method of claim 1, wherein the speakable credential is a string of alphanumeric characters.

6. The method of claim 1, wherein the speakable credential includes one or more words.

7. A system comprising one or more processors and memory operably coupled with the one or more processors, wherein the memory stores instructions that, in response to execution of the instructions by one or more processors, cause the one or more processors to:

authenticate a user of a mobile application configured to execute on a first client device with a service configured to execute on one or more servers, wherein the one or more servers are communicatively coupled with the first client device via one or more computing networks, and wherein the service is configured to interact with one or more personal voice assistants associated with a second client device, wherein the personal voice assistant receives spoken natural language speech input from a user and converts the spoken natural language input to digital output data;

based on the authentication, provide, to the first client device via one or more of the computing networks, a speakable credential, wherein the speakable credential is configured to be spoken aloud by the user, and wherein the providing triggers the first client device to provide, as output using one or more output devices of the first client device, the speakable credential;

receive, directly or indirectly from the personal voice assistant associated with the second client device, digital output data that is generated in response to spoken natural language speech input from the user received at the second client device, wherein the spoken natural language speech input includes an utterance by the user of the speakable credential;

match the data to the speakable credential;

authenticate the personal voice assistant associated with the second client device with the service based on the matching; and wherein the instructions to provide the speakable credential further comprise a message instructions to be output along with the speakable credential at the first client device by the personal voice assistant associated with the second client device, and further wherein the instructions to provide the speakable credential trigger the first client device to visually output the speakable credential on a display.

8. The system of claim 7, wherein the instructions to provide the speakable credential trigger the first client device to audibly output the speakable credential using a speaker.

9. The system of claim 7, wherein receipt of the speakable credential triggers the mobile application to provide the speakable credential as output.

10. The system of claim 7, wherein the service is part of a library of voice-actuable services that are accessible to one or more personal voice assistants.

11. A non-transitory computer-readable medium comprising instructions that, in response to execution of the instructions by one or more processors, cause the one or more processors to perform the following operations:

authenticating a user of a mobile application configured to execute on a first client device with a service configured to execute on one or more servers, wherein the one or more servers are communicatively coupled with the first client device via one or more computing networks, and wherein the service is configured to interact with one or more personal voice assistants associated with a second client device, wherein the personal voice assistant receives spoken natural language speech input from a user and converts the spoken natural language input to digital output data;

based on the authenticating, providing, to the first client device via one or more of the computing networks, a speakable credential, wherein the speakable credential is configured to be spoken aloud by the user, and wherein the providing triggers the first client device to provide, as output using one or more output devices of the first client device, the speakable credential;

receiving, directly or indirectly from the personal voice assistant associated with the second client device, digital output data that is generated in response to spoken natural language speech input from the user received at the second client device, wherein the spoken natural language speech input includes an utterance by the user of the speakable credential;

matching the data to the speakable credential;

authenticating the personal voice assistant associated with the second client device with the service based on the matching; and wherein the step of providing the speakable credential includes providing a message to be output accompanying the speakable credential at the first client device by the personal voice assistant associated with the second client device, and further wherein the providing triggers the first client device to visually output the speakable credential on a display.

* * * * *